United States Patent
Stefan et al.

(10) Patent No.: US 10,363,959 B2
(45) Date of Patent: Jul. 30, 2019

(54) METHOD FOR ASSISTING A MANEUVERING PROCESS OF A MOTOR VEHICLE, AND PARKING ASSISTANCE DEVICE

(71) Applicant: FORD GLOBAL TECHNOLOGIES, LLC, Dearborn, MI (US)

(72) Inventors: Frederic Stefan, Aachen (DE); Uwe Gussen, Huertgenwald (DE); Christoph Arndt, Moerlen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 180 days.

(21) Appl. No.: 14/925,180

(22) Filed: Oct. 28, 2015

(65) Prior Publication Data
US 2016/0114797 A1    Apr. 28, 2016

(30) Foreign Application Priority Data

Oct. 28, 2014 (DE) .......................... 10 2014 221 920

(51) Int. Cl.
| | |
|---|---|
| *B60W 30/06* | (2006.01) |
| *B60Q 1/48* | (2006.01) |
| *B62D 6/00* | (2006.01) |
| *B60Q 1/00* | (2006.01) |
| *G08G 1/14* | (2006.01) |
| *B62D 15/02* | (2006.01) |

(52) U.S. Cl.
CPC ............................. *B62D 15/0285* (2013.01)

(58) Field of Classification Search
CPC ....... B60W 30/06; B60Q 9/004; B60Q 9/005; B60Q 1/48; B60Q 1/00; B62D 15/028; B62D 15/027; B62D 6/00; G08G 1/14
See application file for complete search history.

(56) References Cited

U.S. PATENT DOCUMENTS

| | | | |
|---|---|---|---|
| 6,683,539 B2 * | 1/2004 | Trajkovic | B60Q 9/005 180/271 |
| 2007/0282503 A1 * | 12/2007 | Luke | B62D 15/027 701/44 |
| 2010/0013670 A1 * | 1/2010 | Hueppauff | B62D 15/028 340/932.2 |
| 2012/0139716 A1 * | 6/2012 | Nagamine | B60Q 9/004 340/438 |

(Continued)

FOREIGN PATENT DOCUMENTS

| | | |
|---|---|---|
| CN | 101132964 A | 2/2008 |
| DE | 102007004972 A1 | 7/2008 |

(Continued)

*Primary Examiner* — Yuri Kan
(74) *Attorney, Agent, or Firm* — Frank MacKenzie; Brooks Kushman P.C.

(57) ABSTRACT

A method for assisting a maneuvering process of a motor vehicle, and a parking assistance device are provided. In a method for assisting a maneuvering process of a motor vehicle, wherein longitudinal and lateral control of the movement of the motor vehicle is carried out on the basis of predefined setpoint values of the direction of travel, speed or steering angle in order to automatically carry out the maneuvering process, at least some of these setpoint values and the chronological sequence in which the setpoint values are predefined during the maneuvering process are stored.

12 Claims, 2 Drawing Sheets

(56) References Cited

U.S. PATENT DOCUMENTS

2013/0096765 A1   4/2013   Jun

FOREIGN PATENT DOCUMENTS

| DE | 102008027689 A1 | 12/2009 |
| DE | 102009025328 A1 | 12/2010 |
| DE | 102011082826 A1 | 3/2013 |
| DE | 102012024151 A1 | 7/2013 |
| DE | 102013102504 A1 | 9/2013 |

* cited by examiner

METHOD FOR ASSISTING A MANEUVERING PROCESS OF A MOTOR VEHICLE, AND PARKING ASSISTANCE DEVICE

CROSS-REFERENCE TO RELATED APPLICATION

This application claims foreign priority benefits under 35 U.S.C. § 119(a)-(d) to DE 10 2014 221 920.5, filed Oct. 28, 2014, which is hereby incorporated by reference in its entirety.

TECHNICAL FIELD

This disclosure relates to a method for assisting a maneuvering process of a motor vehicle, and to a parking assistance device.

BACKGROUND

Parking assistance devices which will be commercially available permit automatic execution of parking processes without a driver being on-board the motor vehicle. Such parking assistance devices generally have a multiplicity of sensors for monitoring the surroundings of the vehicle, wherein setpoint values are generated for the longitudinal control of the vehicle (by means of the drive, activation of the brakes and positioning of the shift) and the lateral control of the vehicle (by steering).

A problem which occurs in practice here is that in certain circumstances "stuck" situations can occur depending on the condition of the respective parking space, in which situations, for example, the respective vehicle becomes immobilized during the parking process or process of leaving the parking space and the assistance by a parking assistance device breaks off, wherein, if appropriate—for example in the case of remote-controlled parking—, the entry possibility of the driver is blocked without any possibility of remedy being provided.

Further problems which occur in practice can result from the fact that different vehicles react in different ways to the abovementioned setpoint values which are set during the control process, which may be due, for example, to the wear of individual components (for example brakes or engine), to a change which has occurred in environmental conditions or to different equipment levels in the respective vehicle (for example in terms of the engine, brake linings, tire sizes etc.). In this context, different combinations of corresponding variations can lead to deviations in the reaction of the vehicle to respectively predefined setpoint values.

With respect to the prior art, reference is made merely by way of example to DE 10 2007 004 972 A1, DE 10 2008 027 689 A1 and DE 10 2009 025 328 A1.

SUMMARY

An object of the disclosure is to make available a method for assisting a maneuvering process and a parking assistance device which permit more reliable execution of maneuvering processes while avoiding or alleviating the problems described above.

In a method for assisting a maneuvering process of a motor vehicle, wherein longitudinal and lateral control of the movement of the motor vehicle is carried out on the basis of predefined setpoint values of the direction of travel, speed and/or steering angle in order to automatically carry out the maneuvering process, at least some of these setpoint values and the chronological sequence in which the setpoint values are predefined during the maneuvering process are stored.

This is based, in particular, on the concept of storing the setpoint values which are respectively set during the assistance of a maneuvering process by a parking assistance device, in a chronological sequence. This provides the possibility, in the case of a "stuck" position of the respective vehicle being reached, of permitting exiting or return from this position by virtue of the fact that corresponding setpoint values are processed in a reverse sequence, with the result that the vehicle can exit the corresponding stuck situation again. In this context the vehicle follows the same route with which it got into the respective situation until, for example, it is detected by using parking sensors that no such "stuck" situation exists any more.

In addition to the possibility of exiting a stuck situation of the vehicle, there is a further application in that basically a better prediction or estimation of any faults during the tracking of a specific path or trajectory is made possible for any parking maneuver with the result that accordingly the setpoint values which are predefined during the control can also be optimized by minimizing such faults. Corresponding optimization can be stored in the parking assistance device and used as an initial setting during a subsequent or future parking maneuver.

According to one embodiment, the storage takes place in such a way that exiting from a vehicle position which is brought about during the maneuvering process is made possible on the basis of the stored setpoint values.

According to one embodiment, in order to exit from a vehicle position which is brought about during the maneuvering process, the stored setpoint values are predefined in a sequence which is opposed to the stored chronological sequence.

According to one embodiment, the exiting from a vehicle position which is brought about during the maneuvering process is carried out by predefining the stored setpoint values in a sequence which is opposed to the stored chronological sequence, in reaction to a driver input.

According to one embodiment, the stored setpoint values are setpoint values for the direction of travel, speed or steering angle.

According to one embodiment, adaptation of setpoint values which are predefined in a later remaneuvering process is performed on the basis of the stored setpoint values.

According to one embodiment, this adaptation is carried out if a fault which is induced during a maneuvering process with respect to the vehicle position which is brought about by the longitudinal and lateral control is above a predefined threshold value.

According to one embodiment, this adaptation is carried out by taking into account at least one parameter which characterizes the state of the vehicle.

Some embodiments also relate to a parking assistance device for assisting a maneuvering process of a motor vehicle, wherein longitudinal and lateral control of the movement of the motor vehicle can be carried out on the basis of predefined setpoint values of the direction of travel, speed and/or steering angle in order to automatically carry out the maneuvering process, wherein the parking assistance device is configured to carry out a method having the features described above.

DETAILED DESCRIPTION

In the text which follows, components of the device are explained with reference to the schematic overview diagram in FIG. 1.

Figure 1:
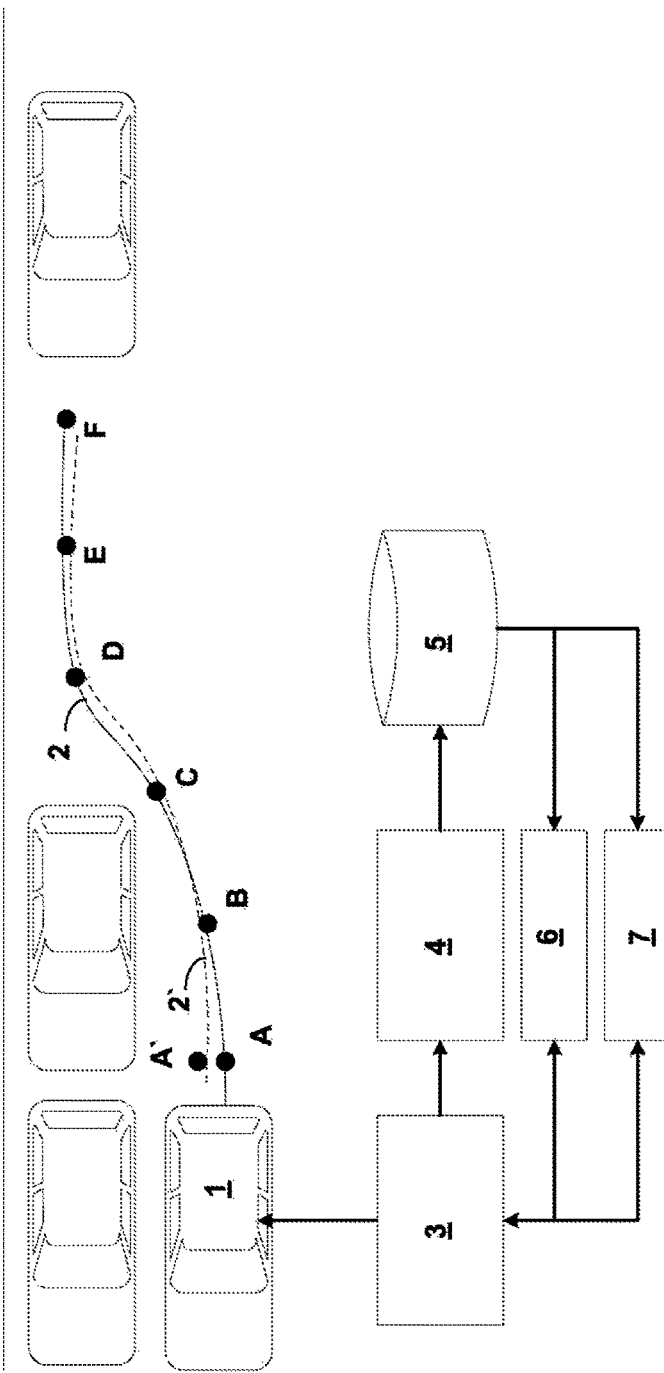
FIG. 1 shows a schematic overview diagram explaining components of the device.

According to FIG. 1, "1" denotes a vehicle which is to be parked using a parking assistance device, wherein the parking assistance device which is denoted by "3" is capable of performing lateral and longitudinal control of the vehicle 1 during an autonomous maneuvering process.

A trajectory which is planned by the parking assistance device 3 is denoted by "2", wherein a multiplicity of points A, B, C, . . . is shown, at each of which a change in the setpoint values on which the control is based takes place. Furthermore, the corresponding reaction of the vehicle 1, i.e. the actually described trajectory 2' of the vehicle 1 is denoted by a dashed line.

A data extraction device 4 and a memory unit 5 serve to sequentially extract or store the abovementioned setpoint values at the points A to F and the corresponding reaction of the vehicle (corresponding to the points A' to F'), wherein the storage is maintained even when the ignition is switched off. In this context, the respectively last entry also corresponds to the movement carried out last by the vehicle 1. An exemplary data block is specified in Table 1.

TABLE 1

| Position during vehicle movement | Setpoint values of the vehicle control (Direction: R = Reverse, D = Forward; V = Velocity; A = Steering angle) | Vehicle reaction |
|---|---|---|
| A | R, V1, A1 | R, V1', A1' |
| B | R, V2, A2 | R, V2', A2' |
| C | R, V3, A3 | R, V3', A3' |
| D | R, V4, A4 | R, V4', A4' |
| E | R, V5, A5 | R, V5', A5' |
| F | R, V6, A6 | R, V6', A6' |

"6" denotes a device for detecting a stuck situation. This device 6 serves, in particular, to assist the parking assistance device 3 such that during the presence of a stuck situation of the vehicle 1 suitable equivalent setpoint values are made available for exiting the stuck situation.

Figure 2:
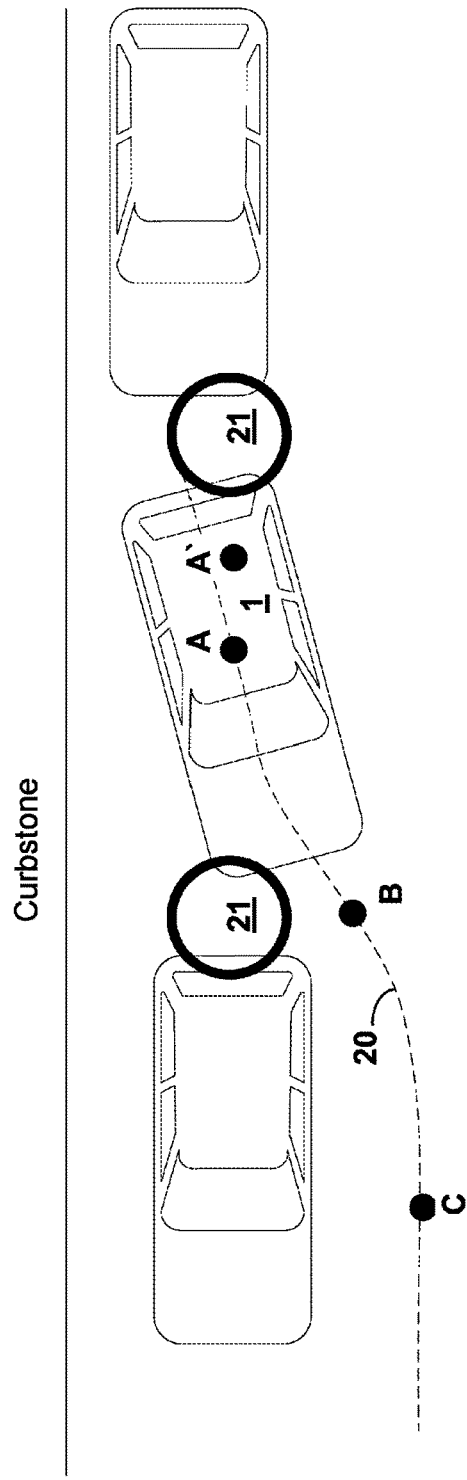
FIG. 2 shows a schematic illustration explaining an exemplary scenario which occurs during execution.

FIG. 2 shows a schematic illustration of an exemplary scenario in which the vehicle 1 moves along the trajectory 20 between points or positions B and A' in accordance with the setpoint values on which the longitudinal and lateral control is based. It is assumed that the vehicle movement stops at a certain point A, since the vehicle 1 detects a "stuck" situation 21. This results in the vehicle 1 not being able to be moved as far as the point A'. In order to overcome this situation or to solve the problem, the parking assistance device 3 retrieves, from the stored data block, the group of setpoint values R, V1, A1 (where R denotes the direction "reverse" and where V1 and A1 symbolize values for the speed and steering angle, respectively) on which the control is based. The parking assistance device then reverses the direction of travel and uses the setpoint values D, V1, A1, where D denotes the direction "forward") as "new" setpoint values for the control process.

If appropriate, before this method is carried out it is possible to demand a confirmation from the driver, or the request to overcome the stuck situation can be issued by the driver himself.

The vehicle 1 then maneuvers out of the stuck situation back to the position B. In this position, the "stuck" situation is cancelled, with the result that the parking maneuver can be ended or completed by using the parking assistance device.

"7" denotes a unit for generating correspondingly improved setpoint values. The unit 7 serves to analyze the faults which are caused or induced by the actual vehicle reactions and to perform corresponding adaptations of the setpoint values which are used as the basis for the control process, if, for example, a fault which is induced with respect to the vehicle position is above a specific threshold value.

In this context, adjustment of the unit 7 can occur on the basis of the current vehicle state (for example by taking into account relatively old brake linings, an inadequate tire pressure, a relatively old engine or an overloaded vehicle). The improvement which is achieved here in terms of the generation of setpoint values can be taken into account by the parking assistance device 3. As a result, in this way, a more precise or refined generation of setpoint values can therefore be carried out in any future parking maneuver, in order to be able to achieve the best possible adaptation to the state of the vehicle in every case.

What is claimed is:

1. A method comprising:
during an assisted parking maneuver (APM) in which a stored plurality of values define a maneuvering trajectory followed by a vehicle during the APM, and in response to occurrence of a stuck condition, processing by a controller the values in reverse order to exit the stuck condition by returning the vehicle to a position on the maneuvering trajectory encountered prior to the stuck condition.

2. The method according to claim 1 further comprising altering at least one of the values based on a fault associated with the maneuvering trajectory.

3. The method according to claim 1, wherein the values are stored in a chronological sequence.

4. The method according to claim 1, wherein each of the values specifies a predefined direction of travel.

5. The method according to claim 1, wherein each of the values specifies a predefined speed.

6. The method according to claim 1, wherein each of the values specifies a predefined steering angle.

7. A parking system comprising:
a controller programmed to, during an assisted parking maneuver (APM) in which a stored plurality of values define a maneuvering trajectory followed by a vehicle during the APM, and in response to occurrence of a stuck condition, process the values in reverse order to exit the stuck condition by returning the vehicle to a position on the maneuvering trajectory encountered prior to the stuck condition.

8. The system according to claim 7, wherein the controller is further programmed to alter at least one of the values based on a fault associated with the maneuvering trajectory.

9. The system according to claim 7, wherein the values are stored in a chronological sequence.

10. The system according to claim 7, wherein each of the values specifies a predefined direction of travel.

11. The system according to claim 7, wherein each of the values specifies a predefined speed.

12. The system according to claim 7, wherein each of the values specifies a predefined steering angle.

* * * * *